(12) United States Patent
Karin et al.

(10) Patent No.: US 11,991,210 B2
(45) Date of Patent: May 21, 2024

(54) MACHINE LEARNING-BASED TECHNIQUES FOR IDENTIFYING DEPLOYMENT ENVIRONMENTS AND ENHANCING SECURITY THEREOF

(71) Applicant: Microsoft Technology Licensing, LLC, Redmond, WA (US)

(72) Inventors: Omer Karin, Tel Aviv (IL); Amit Magen, Netanya (IL); Moshe Israel, Ramat-Gan (IL); Tamer Salman, Haifa (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 211 days.

(21) Appl. No.: 17/080,204

(22) Filed: Oct. 26, 2020

(65) Prior Publication Data
US 2022/0131900 A1    Apr. 28, 2022

(51) Int. Cl.
*H04L 9/40*         (2022.01)
*G06F 21/57*        (2013.01)
*G06N 20/00*        (2019.01)

(52) U.S. Cl.
CPC .............. *H04L 63/20* (2013.01); *G06F 21/57* (2013.01); *G06F 21/572* (2013.01); *G06N 20/00* (2019.01); *G06F 2221/034* (2013.01)

(58) Field of Classification Search
CPC ... H04L 63/1433; H04L 63/20; H04L 63/205; G06F 21/57; G06F 21/572; G06F 21/577; G06F 2221/034; G06N 20/00
See application file for complete search history.

(56) References Cited

U.S. PATENT DOCUMENTS 10,713,664 B1 *   7/2020   Alagappan ........... G06Q 30/018
11,140,061 B1 *  10/2021   Sanders ................ G06F 21/577
(Continued)

FOREIGN PATENT DOCUMENTS

WO    2017212357 A1   12/2017
WO    2019091697 A1    5/2019
WO    2019091698 A1    5/2019

OTHER PUBLICATIONS

"International Search Report and Written Opinion Issued in PCT Application No. PCT/US21/045458", dated Nov. 23, 2021, 9 Pages.

*Primary Examiner* — Eric W Shepperd
(74) *Attorney, Agent, or Firm* — Weaver IP L.L.C.

(57) ABSTRACT

Methods, systems, apparatuses, and computer-readable storage mediums are described for machine learning-based techniques for identifying a deployment environment in which computing resources (e.g., servers, virtual machines, databases, etc.) reside and for enhancing security for the identified deployment environment. For instance, usage data is collected from the computing resources. The usage data is featurized and provided to a machine learning-based classification model that determines a deployment environment in which the computing resources reside based on the featurized usage data. Once the deployment environment is identified, a security policy that is applicable for the identified deployment environment is determined. The security policy specifies a plurality of recommended security settings that should be applied to the computing resources included in the identified deployment environment. The recommended security settings may be provided to the user (e.g., via a graphical user interface) for application thereby and/or may be automatically activated.

20 Claims, 8 Drawing Sheets

(56) References Cited

U.S. PATENT DOCUMENTS

| | | | | |
|---|---|---|---|---|
| 11,347,629 | B2* | 5/2022 | Sharma | G06Q 10/04 |
| 2005/0097199 | A1* | 5/2005 | Woodard | H04L 67/125 |
| | | | | 709/224 |
| 2006/0075461 | A1* | 4/2006 | Vayman | H04L 63/102 |
| | | | | 726/1 |
| 2008/0059214 | A1* | 3/2008 | Vinberg | G06Q 10/067 |
| | | | | 705/348 |
| 2008/0244690 | A1* | 10/2008 | Kulkarni | G06F 21/552 |
| | | | | 726/1 |
| 2010/0332422 | A1* | 12/2010 | Cheng | G06N 20/00 |
| | | | | 706/12 |
| 2016/0315965 | A1* | 10/2016 | Sastry | H04L 63/105 |
| 2017/0250870 | A1* | 8/2017 | Zhao | H04L 63/20 |
| 2018/0027051 | A1* | 1/2018 | Parees | G06F 8/71 |
| | | | | 709/217 |
| 2018/0324219 | A1* | 11/2018 | Xie | H04L 63/0209 |
| 2019/0007415 | A1* | 1/2019 | Kliger | H04L 63/104 |
| 2019/0286826 | A1* | 9/2019 | Bargury | G06F 21/577 |
| 2019/0317754 | A1* | 10/2019 | Mosquera | H04L 51/02 |
| 2020/0026865 | A1* | 1/2020 | Hulick, Jr. | G06F 21/604 |
| 2020/0053090 | A1* | 2/2020 | Kliger | G06F 21/604 |
| 2020/0110596 | A1* | 4/2020 | Niininen | G06F 8/70 |
| 2020/0177634 | A1 | 6/2020 | Hwang et al. | |
| 2020/0177638 | A1* | 6/2020 | Salman | H04L 41/12 |
| 2020/0272432 | A1* | 8/2020 | Shaikh | G06N 3/08 |
| 2020/0294108 | A1* | 9/2020 | Perry | G06N 20/00 |
| 2021/0037040 | A1* | 2/2021 | Aleks | H04L 63/205 |
| 2021/0051177 | A1* | 2/2021 | White | H04L 67/56 |
| 2021/0072983 | A1* | 3/2021 | Hohenstein | G06F 8/70 |
| 2021/0157926 | A1* | 5/2021 | Handurukande | G06F 21/563 |
| 2021/0182403 | A1* | 6/2021 | Shackleton | G06F 9/45558 |
| 2021/0182404 | A1* | 6/2021 | Shackleton | G06F 21/54 |
| 2021/0287120 | A1* | 9/2021 | Mamidi | G06N 20/00 |
| 2021/0350276 | A1* | 11/2021 | Ashlock | G06K 9/6215 |
| 2021/0405976 | A1* | 12/2021 | Gaitonde | G06F 11/3664 |
| 2022/0083644 | A1* | 3/2022 | Kulshreshtha | G06N 20/00 |
| 2022/0131904 | A1* | 4/2022 | Wright | H04L 63/205 |

* cited by examiner

MACHINE LEARNING-BASED TECHNIQUES FOR IDENTIFYING DEPLOYMENT ENVIRONMENTS AND ENHANCING SECURITY THEREOF

BACKGROUND

A deployment environment is an environment in which a computer program (e.g., a software component) is deployed and executed. In simple cases, such as developing and immediately executing a program on the same machine, there may be a single environment. However, in industrial use, separate environments may be utilized, each having its own purposes. For instance, a development environment is a type of deployment environment in which changes to software are developed. The changed or new software is then moved to a testing environment. A testing environment is a type of deployment environment in which human testers are enabled to exercise (or test) new and changed code via either automated checks or non-automated techniques. Upon test failure, the test environment can remove the faulty code from the test platforms, contact the responsible developer, and provide detailed test and result logs. If all tests pass, the test environment may automatically promote the code to the next deployment environment, such as the staging environment. The staging environment (or pre-production environment) is an environment for testing that seeks to mirror an actual production environment as closely as possible and may connect to other production services and data, such as a database. The primary use of a staging environment is to test all the installation/configuration/migration scripts and procedures before they are applied to a production environment. This ensures all major and minor upgrades to a production environment are completed reliably, without any errors. The production (or live) environment is the environment that users (e.g., end users) directly interact with to utilize the software.

Modern cloud providers host very large and diverse customers. Many of these customers use the cloud for hosting various deployment environments, where each deployment environment is supported by a respective set of servers or nodes (e.g., development servers, testing servers, production servers, etc.). These various environments often have different security requirements. For example, production servers are more sensitive and require stricter monitoring. However, deployment environments are generally not pre-specified. Because of this, a challenge exits for the cloud provider to determine the security settings that are applicable for such environments.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer-readable storage mediums are described for machine learning-based techniques for identifying a deployment environment in which computing resources (e.g., servers, virtual machines, databases, etc.) reside and for enhancing security for the identified deployment environment. For instance, usage data is collected from the computing resources. The usage data is featurized and provided to a machine learning-based classification model that determines a deployment environment in which the computing resources reside based on the featurized usage data. Once the deployment environment is identified, a security policy that is applicable for the identified deployment environment is determined. The security policy specifies a plurality of recommended security settings that should be applied to the computing resources included in the identified deployment environment. The recommended security settings may be provided to the user (e.g., via a graphical user interface) for application thereby and/or may be automatically activated.

Further features and advantages of embodiments, as well as the structure and operation of various embodiments, are described in detail below with reference to the accompanying drawings. It is noted that the methods and systems are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
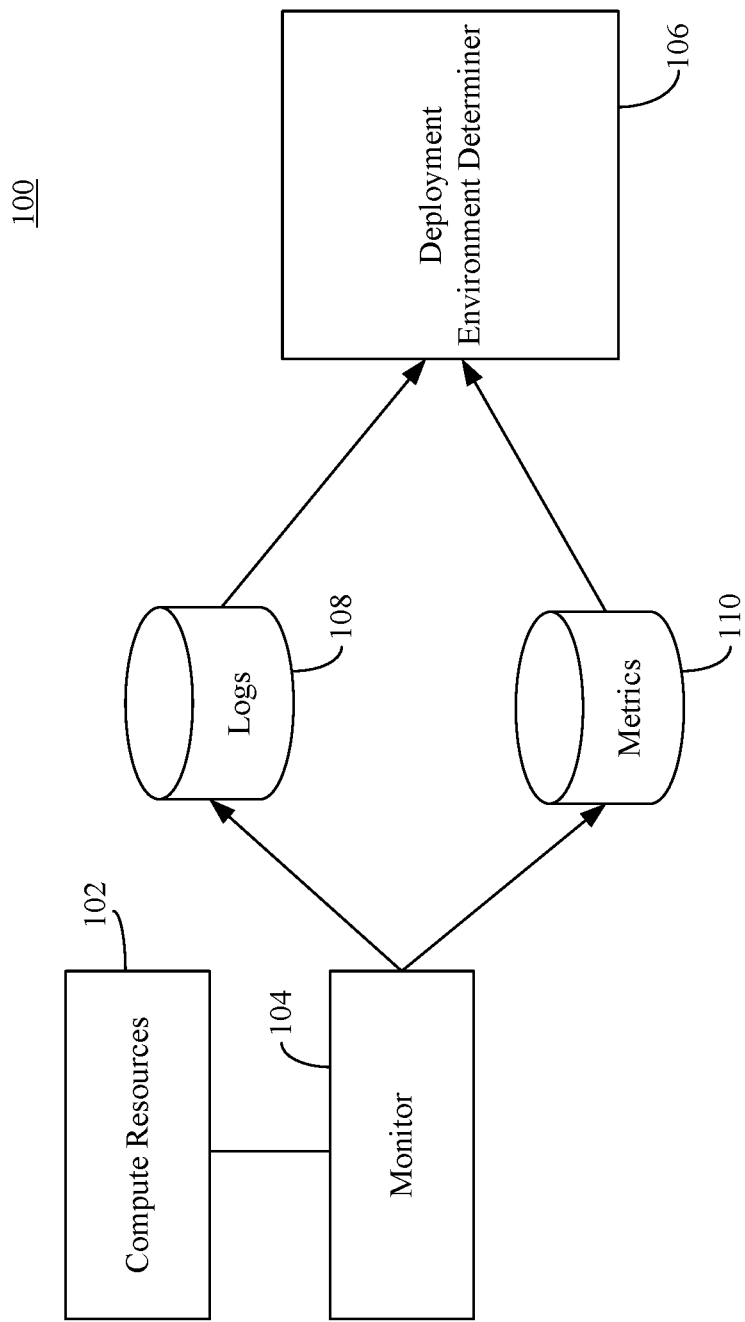
FIG. 1 shows a block diagram of a security management system in accordance with an example embodiment.

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements.

The drawing in which an element first appears is indicated by the leftmost digit(s) in the corresponding reference number.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

Embodiments described herein are directed to machine learning-based techniques for identifying a deployment environment in which computing resources (e.g., servers, virtual machines, databases, etc.) reside and for enhancing security for the identified deployment environment. For instance, usage data is collected from the computing resources. The usage data is featurized and provided to a machine learning-based classification model that determines a deployment environment in which the computing resources reside based on the featurized usage data. Once the deployment environment is identified, a security policy that is applicable for the identified deployment environment is determined. The security policy specifies a plurality of recommended security settings that should be applied to the computing resources included in the identified deployment environment. The recommended security settings may be provided to the user (e.g., via a graphical user interface) for application thereby and/or may be automatically activated.

The foregoing techniques advantageously enhance the security of deployment environments. By automatically inferring a deployment environment in which computing resources reside, security settings that are tailored for such a deployment environment are determined and applied. Accordingly, deployment environments that operate with sensitive data and require additional security measures are properly protected. Moreover, computing resources of deployment environments that do not require as stringent of a security policy are relieved from the burden of executing unnecessary security programs or routines, which are often very compute intensive. Accordingly, the functioning of such computing resources is improved, as the number of certain compute resources (e.g., input/output (I/O) operations, processor cycles, power, memory, etc.) utilized in such deployment environments is advantageously reduced.

A. Techniques for Identifying a Deployment Environment and Enhancing Security Thereof For instance, FIG. 1 shows a block diagram of a security management system 100 in accordance with an example embodiment. Security management system 100 is configured to provide security management for a variety of different compute resources and threat protection from malicious software (e.g., malware, viruses, etc.). An example of security management system 100 includes, but is not limited to, Azure® Security Center published by Microsoft Corporation of Redmond, Washington. Accordingly, security management system 100 may be located in a cloud-based environment, although the embodiments described herein are not so limited. As shown in FIG. 1, security management system 100 comprises compute resources 102, a monitor 104, a deployment environment determiner 106, a first data store 108, a second data store 110. Examples of compute resources 102 include, but are not limited to, one or more virtual machines, one or more storage accounts, one or more Web applications, one or more databases, one or more cloud-based subscriptions, one or more tenants (i.e., a service instance that an organization receives upon signing up for a cloud-based service, such as Microsoft Azure® published by Microsoft Corporation of Redmond, Washington), etc.

Monitor 104 is configured to monitor compute resources 102 and generate usage data, such as log data and/or metrics associated with each of compute resources 102. The log data may comprise data that describes an event that has occurred with respect to a particular compute resource of compute resources 102. The log data comprises details about the event, such as a compute resource that was accessed, the entity that accessed it, and the time at which it was accessed. For example, the log data may store data related to the network usage of each of compute resources 102, account usage associated with compute resources 102, process creation information associated with compute resources 102, processor (e.g., central processing unit (CPU)) usage associated with compute resources 102, memory usage associated with compute resources 102, etc. Examples of network usage include, but are not limited to, a number and/or type of network ports utilized for incoming and/or outgoing data packets received by and/or transmitted from each of compute resources 102, a number and/or type of network packets (e.g., SYN or ACK packets) transmitted and/or received via each of compute resources 102, the network addresses (and/or number thereof) that transmitted data packets, the network addresses (and/or number thereof) of entities (e.g., virtual machines) to which the data packets were transmitted, the size of the data packets, the time at which the data packets were transmitted and/or received, one or more flags associated with each of the data packets (e.g., a SYN flag, an ACK flag, a FIN flag, an URG flag, a PSH flag, a RST flag, etc.), etc. In accordance with an embodiment, such network usage statistics may be in accordance with the IPFIX (Internet Protocol Flow Information Export) protocol. Examples of account usage include, but are not limited to a number of user logins with respect to certain compute resources 102, such as, storage accounts, subscriptions and/or tenants. Examples of process creation information includes, but are not limited to, a number and/or type of processes created via compute resources 102.

Metrics may comprise data (e.g., numerical values) that provide information about a particular compute resource-related process or activity that is measured over intervals of time. For example, metrics may measure how busy a compute resource is (e.g., a request rate), hourly/daily statistics (mean, maximum, minimum, standard deviation, jitter, skew, kurtosis, etc.) with respect to network usage, processing usage, memory usage, and/or process creation, etc., patterns of network usage, etc. Such metrics may be collected at regular intervals (e.g., each second, each minute, each hour, each day, etc.) and may be aggregated as a time series. Monitor 108 stores log data in first data storage 108 and stores metrics in second data storage 110. First data storage 108 and second data storage 110 may be any type of physical memory and/or storage device (or portion thereof) that is described herein, and/or as would be understood by a person of skill in the relevant art(s) having the benefit of this disclosure.

Each of compute resources 102 may associated with a particular deployment environment. As described above, a deployment environment is an environment in which a computer program or software component is deployed and executed. In a cloud-based environment, the different deployment environments may each be implemented via one or more virtual machines, servers, or nodes of the cloud-based environment. For instance, a first set of servers of the cloud-based environment may be utilized for a development environment, a first set of servers of the cloud-based environment may be utilized for a testing environment, a third set of servers of the cloud-based environment may be utilized for a staging environment, and a fourth set of servers of the cloud-based environment may be utilized for a production environment.

Each of such deployment environments may be associated with a respective security policy, where certain deployment environments are required to have a more stringent security policy than other deployment environments. For instance, a production environment serves an end-user or customer in real time. Private or sensitive data associated with the end user may be utilized in such an environment and shared across a public or unprotected network. Accordingly, a production environment may require a stricter security policy than another environment, such as a test environment in which simulated data is utilized to test software being developed.

Determining which security policy to apply to a deployment environment can be simple process if a deployment environment is explicitly designated as such. However, an environment's context (e.g., development, testing, staging, production, etc.) is usually not well-defined. Accordingly, such deployment environments may not implement an optimal security policy, and therefore, are left vulnerable to malicious activities.

The embodiments described herein remedy such deficiencies. For instance, deployment environment determiner 106 of security management system 100 is configured to automatically determine a deployment environment in which compute resources 102 are included, even in instances where the environment is not explicitly defined. As will be described below with reference to FIG. 2, deployment environment determiner 106 may utilize machine learning-based techniques to determine the deployment environment in which compute resources 102 are included. For instance, deployment environment determiner 106 may retrieve usage data stored via first data store 108 and second data store 110 and generate a feature vector comprising a plurality of features based on the usage data. The feature vector is provided as an input to a machine learning model that determines the deployment environment of compute resource 102 based on the feature vector. After the deployment environment is determined, a security policy applicable for the determined deployment environment is determined.

Figure 2:
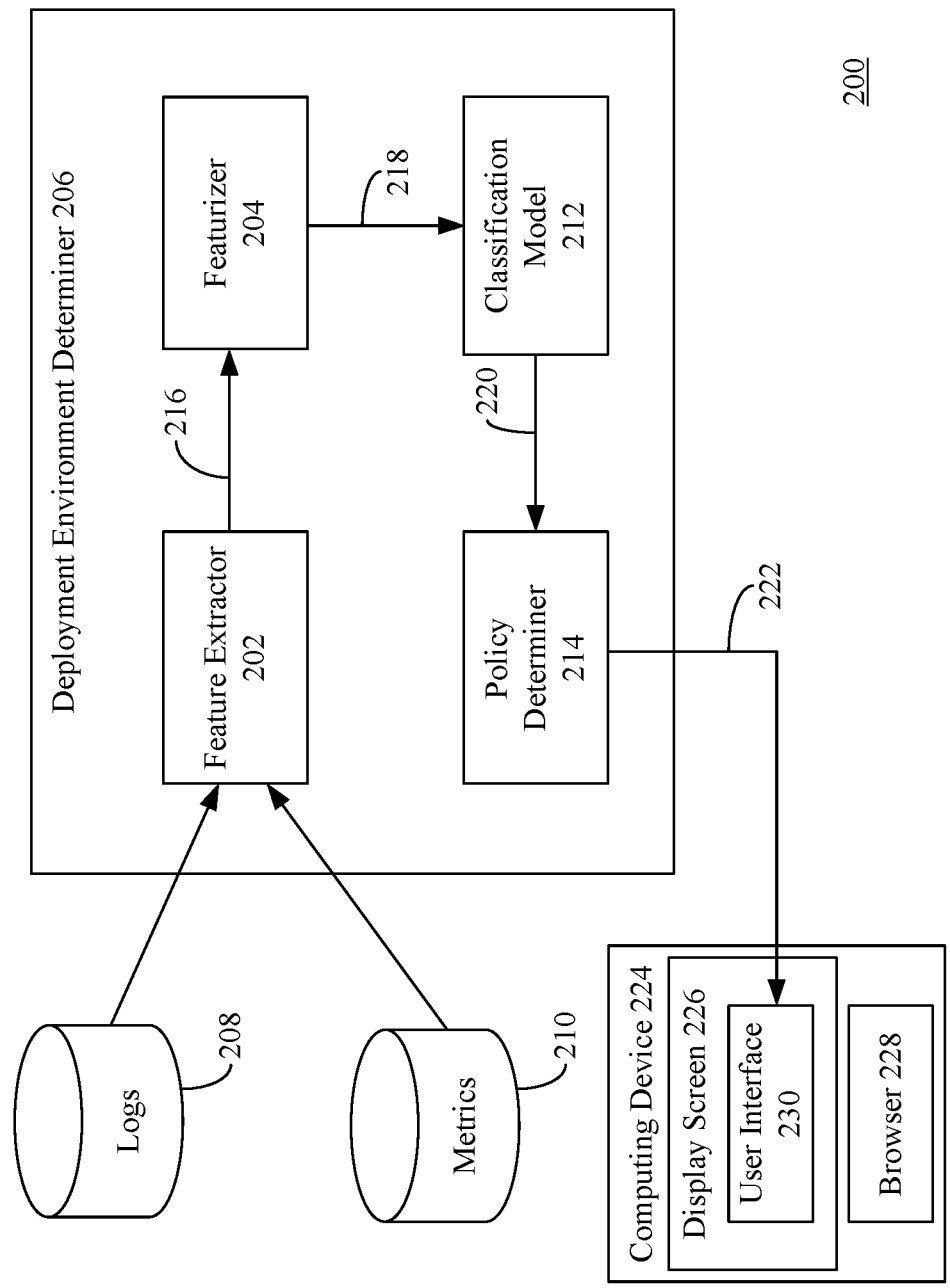
FIG. 2 shows a block diagram of a system for identifying a deployment environment for a plurality of compute resources and enhancing security thereof in accordance with an example embodiment.

FIG. 2 shows a block diagram of a system 200 for identifying a deployment environment for a plurality of compute resources and enhancing security thereof in accordance with an example embodiment. System 200 includes a first data store 208, a second data store 210, a deployment environment determiner 206, and a computing device 224. First data store 208, second data store 210, and deployment environment determiner 206 are examples of first data store 108, second data store 110 and deployment environment determiner 106, as respectively described above with reference to FIG. 1. Deployment environment determiner 206, first data store 208, second data store 210, and/or computing device 224 may be included in a security management system, such as security management system 100 As shown in FIG. 2, deployment environment determiner 206 comprises a feature extractor 202, a featurizer 204, a classification model 212, and a policy determiner 214.

Feature extractor 202 is configured retrieve logs and/or metrics from first data store 208 and/or second data store 210, respectively, and extract usage data-related features 216 therefrom. Examples of such features 216 include, but are not limited to, network usage of each of compute resources (e.g., compute resources 102, as shown in FIG. 1) for which the deployment environment is being determined compute resources 102, account usage associated with such compute resources, process creation information associated with such compute resources, processor usage associated with such compute resources, memory usage associated with such compute resources, etc. Examples of network usage include, but are not limited to, a number and/or type of network ports utilized for incoming and/or outgoing data packets received by and/or transmitted from each of such compute resources, a number and/or type of network packets (e.g., SYN or ACK packets) transmitted and/or received via each of such compute resources, the network addresses (and/or number thereof) that transmitted data packets, the network addresses (and/or number thereof) of entities (e.g., virtual machines) to which the data packets were transmitted, the size of the data packets, the time at which the data packets were transmitted and/or received, one or more flags associated with each of the data packets (e.g., a SYN flag, an ACK flag, a FIN flag, an URG flag, a PSH, flag, a RST flag, etc.), etc. Examples of account usage include, but are not limited to, a number of user logins with respect to such compute resources. Examples of process creation information includes, but is not limited to, a number and/or type of processes created via such compute resources. Additional features may include, but are not limited to, statistics (mean, maximum, minimum, standard deviation, jitter, skew, kurtosis, etc.) with respect to network usage, processing usage, memory usage, and/or process creation, etc., patterns of network usage, etc. One or more of the features may be extracted from one or more fields of the logs (e.g., IPFIX-based logs) and/or metrics that explicitly comprise such features.

Extracted features 216 are provided to featurizer 204. Featurizer 204 is configured to generate a feature vector 218 for the compute resources (e.g., compute resources 102) based on the extracted features. Feature vector 218 generated by featurizer 204 may take any form, such as a numerical, visual and/or textual representation, or may comprise any other suitable form. In an embodiment, feature vector 218 may include features such as keywords, a total number of words, and/or any other distinguishing aspects relating to the logs and/or metrics that may be extracted therefrom. Featurizer 204 may operate in a number of ways to featurize, or generate feature vector 218 for, the logs and/or metrics. For example and without limitation, featurizer 210 may featurize logs and/or metrics through time series analysis, keyword featurization, semantic-based featurization, digit count featurization, and/or n-gram-TFIDF (term frequency-inverse document frequency) featurization. Feature vector 218 is provided to classification model 212.

Classification model 216 is configured to generate one or more classifications 220 based on feature vector 218. Each of classification(s) 220 is indicative of the likelihood that the compute resources (e.g., compute resources 102) belong into a particular deployment environment. For example, each of classification(s) 220 may be associated with a value (or score) between 0.0 and 1.0, where higher the number, the greater the likelihood that the compute resources belong to a particular deployment environment represented by the classification. As an example, classification model 212 may output several classifications for compute resources: a test environment classification, a staging environment classification, and a production environment classification. In this example, classification model 212 may output a score of 0.5 for the test environment classification, outputs a score of 0.3 for the staging environment classification, and outputs a score of 0.2 for the production environment classification. In this example, the determined classification for the compute resources would be the test environment classification, as it has the highest score. It is noted that the score values described herein are purely exemplary and that other score values may be utilized. In accordance with an embodiment, classification model 212 is a logistic regression-based or random forest-based classification model. Techniques for generating classification model 212 are described below with reference to FIGS. 6 and 7.

Classification(s) 220 are provided to policy determiner 214. Policy determiner 214 is configured to determine a security policy to be applied for the compute resources (e.g., compute resources 102) based on classification(s) 220. For instance, policy determiner 214 may maintain a data structure (e.g., table) that maps different security policies to different deployment environments. Policy determiner 214 may analyze the scores of classification(s) 220 to determine the highest score. The classification of classification(s) 220 having the highest score is determined to be the classification of the compute resources for which feature vector 218 was generated. Alternatively, classification model 212 may provide the classification having the highest score to policy determiner 214. After determining the deployment classification, policy determiner 214 may provide, as an input, the classification to the data structure. The data structure outputs the security policy corresponding to the inputted deployment classification.

The determined security policy may be associated with a plurality of recommended actions or security settings to be performed or activated with respect to the compute resources. The recommended actions are specific or applicable to the deployment classification determined by classification model 212. Examples of recommended actions include, but are not limited to, applying system updates, enabling encryption of data, enabling multi-factor authentication, securing management ports, restricting unauthorized network access, enabling distributed denial of service (DDoS) protection, remediating security configurations, enabling auditing and logging, etc. The recommended actions differ per security policy. That is, the recommended actions for a security policy for a test environment may differ from recommended actions for a security policy for a production environment. Policy determiner 214 outputs the recommended actions or security settings (shown as recommended settings 222). It is noted that the recommended actions described above are purely exemplary and that other actions may be recommended.

Recommended settings 222 may be displayed via a graphical user interface (GUI) of a security management system (e.g., security management system 100). For instance, as shown in FIG. 2, a user (e.g., an administrator) may log into the security management system via computing device 224. As shown in FIG. 2, computing device 224 includes a display screen 226 and a browser application 228. A user may access the security management system by interacting with an application at computing device 224 capable of accessing the security management system. For example, the user may use browser application 228 to traverse a network address (e.g., a uniform resource locator) to the security management system, which invokes a user interface 230 (e.g., a web page) in a browser window rendered on computing device 224. By interacting with user interface 230, the user may view recommended settings 222 that are provided by policy determiner 214 via user interface 230. Using user interface 230, the user may select each of recommended settings 222 and interact with various user interface elements (e.g., buttons, sliders, etc.) that activate recommended settings 222 for the compute resources. Computing device 224 may be any type of stationary or mobile computing device, including a mobile computer or mobile computing device (e.g., a Microsoft® Surface® device, a laptop computer, a notebook computer, a tablet computer such as an Apple® iPad™, a netbook, etc.), a wearable computing device (e.g., a head-mounted device including smart glasses such as Google® Glass™, etc.), or a stationary computing device such as a desktop computer or PC (personal computer).

In accordance with an embodiment, policy determiner 214 may automatically perform an action that automatically activates such security settings and/or present a notification (e.g., via user interface 230) that indicates which security controls were automatically activated based on the determined deployment environment.

In accordance with another embodiment, policy determiner 214 may determine which of recommended settings 222 have already been implemented for compute resource(s). For instance, each of the compute resources may execute an agent that analyzes the security settings therefor and provides an indication to policy determiner 214 as to which settings have been implemented for the compute resources. Policy determiner 214 may analyze the received indications and determine which settings have been implemented and which settings have not been implemented. Policy determiner 214 may provide notifications (e.g., via user interface 230) that indicates which of the recommended security settings have been implemented and which of the recommended security settings have not been implemented. Policy determiner 214 may further determine a security score for the determined deployment environment based on how many security settings have been implemented for the deployment environment. Additional details regarding the foregoing techniques are described below with reference to FIGS. 4 and 5.

Figure 3:
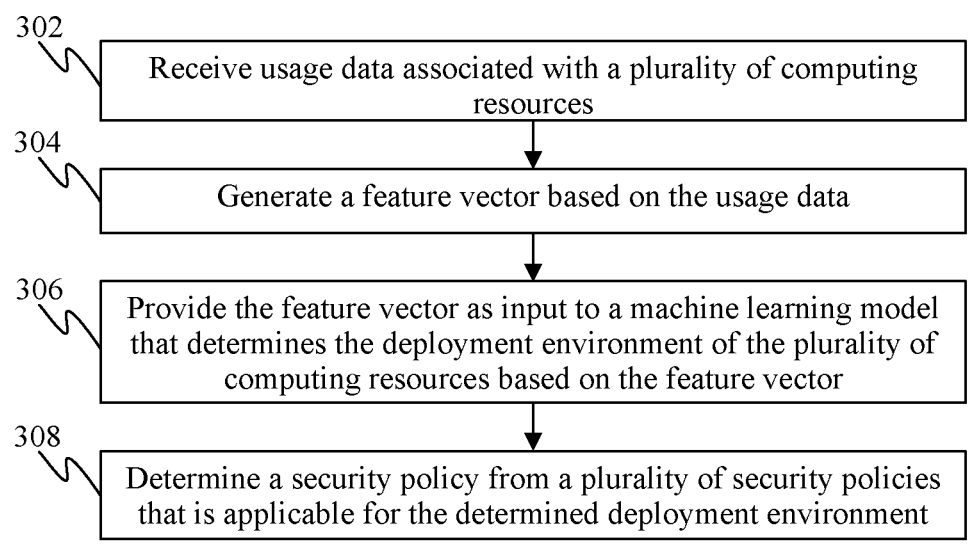
FIG. 3 shows a flowchart of a method for enhancing security for a deployment environment in accordance with example embodiment.

Accordingly, the security of a deployment environment may be enhanced in many ways. FIG. 3 shows a flowchart 300 of a method for enhancing security for a deployment environment in accordance with example embodiment. In an embodiment, flowchart 300 may be implemented by deployment environment determiner 206, as described in FIG. 2. Accordingly, flowchart 300 will be described with continued reference to FIG. 2. Other structural and operational embodiments will be apparent to persons skilled in the relevant art(s) based on the following discussion regarding flowchart 300 and deployment environment determiner 206.

As shown in FIG. 3, the method of flowchart 300 begins at step 302. At step 302, usage data associated with a plurality of computing resources is received. For example, with reference to FIG. 2, feature extractor 202 of deployment environment determiner 206 receives usage data from first data store 208 and/or second data store 210. Feature extractor 202 extracts features 216 from the usage data and provides features 216 to featurizer 204

In accordance with one or more embodiments, the usage data comprises at least one of one or more network ports utilized by each of the plurality of computing resources (e.g., compute resources 102), at least one of a type or number of network packets transmitted by each of the plurality of computing resources, at least one of a type or number of network packets received by each of the plurality of computing resources, an amount of memory utilized by each of the plurality of computing resources, a measure of processing usage for each of the plurality of computing resources, or a pattern of account logins with respect to the plurality of computing resources.

At step 304, a feature vector is generated based on the usage data. For example, with reference to FIG. 2, featurizer 204 generates a feature vector 218 based on features 216. Featurizer 204 provides feature vector 218 to classification model 212.

At step 306, the feature vector is provided as input to a machine learning model that determines the deployment environment of the plurality of computing resources based on the feature vector. For example, with reference to FIG. 2, feature vector 218 is provided as input to classification model 212 that determines the deployment environment of the plurality of computing resources (e.g., compute resources 102, as shown in FIG. 1) based on feature vector 218.

In accordance with one or more embodiments, the determined deployment environment comprises one of a test environment, a production environment, or a staging environment.

At step 308, a security policy from a plurality of security policies that is applicable for the determined deployment environment is determined. For example, with reference with FIG. 2, policy determiner 214 determines a security policy from a plurality of security policies that is application for the determined deployment environment. For instance, classification model 212 outputs classification(s) 220 to policy determiner 214. Policy determiner 214 is configured to determine a security policy to be applied for the compute resources (e.g., compute resources 102) based on classification(s) 220. For instance, policy determiner 214 may maintain a data structure (e.g., table) that maps different security policies to different deployment environments. Policy determiner 214 may analyze the scores of classification(s) 220 to determine the highest score. The classification having the highest score is determined to be the classification of the compute resources for which feature vector 218 was generated. Alternatively, classification model 212 may provide the classification having the highest score to policy determiner 214. After determining the deployment classification, policy determiner 214 may provide, as an input, the classification to the data structure. The data structure outputs the security policy corresponding to the inputted deployment classification.

In accordance with one or more embodiments, the determined security policy comprises a plurality of recommended security settings to be implemented for the plurality of computing resources of the determined deployment environment. For example, with reference to FIG. 2, policy determiner 214 may output recommended settings 222 to be implemented for the computing resources that are in accordance with the determined security policy. Recommended settings 222 may be displayed and activated via user interface 230.

Figure 4:
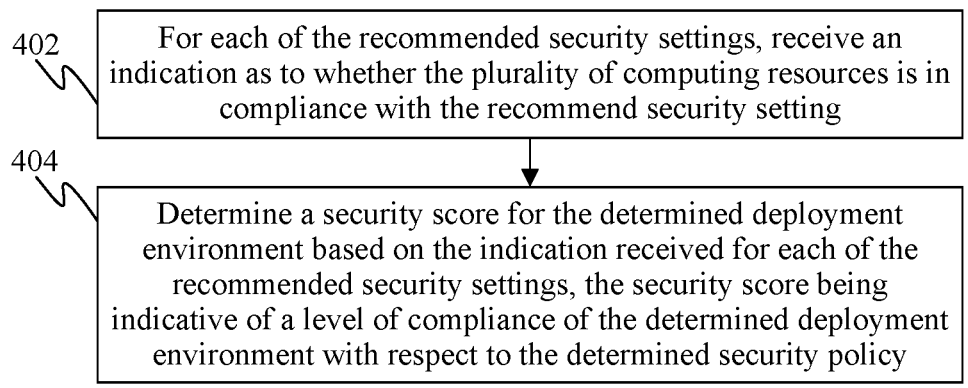
FIG. 4 shows a flowchart of a method for determining a security score for a deployment environment in accordance with example embodiment.
Figure 5:
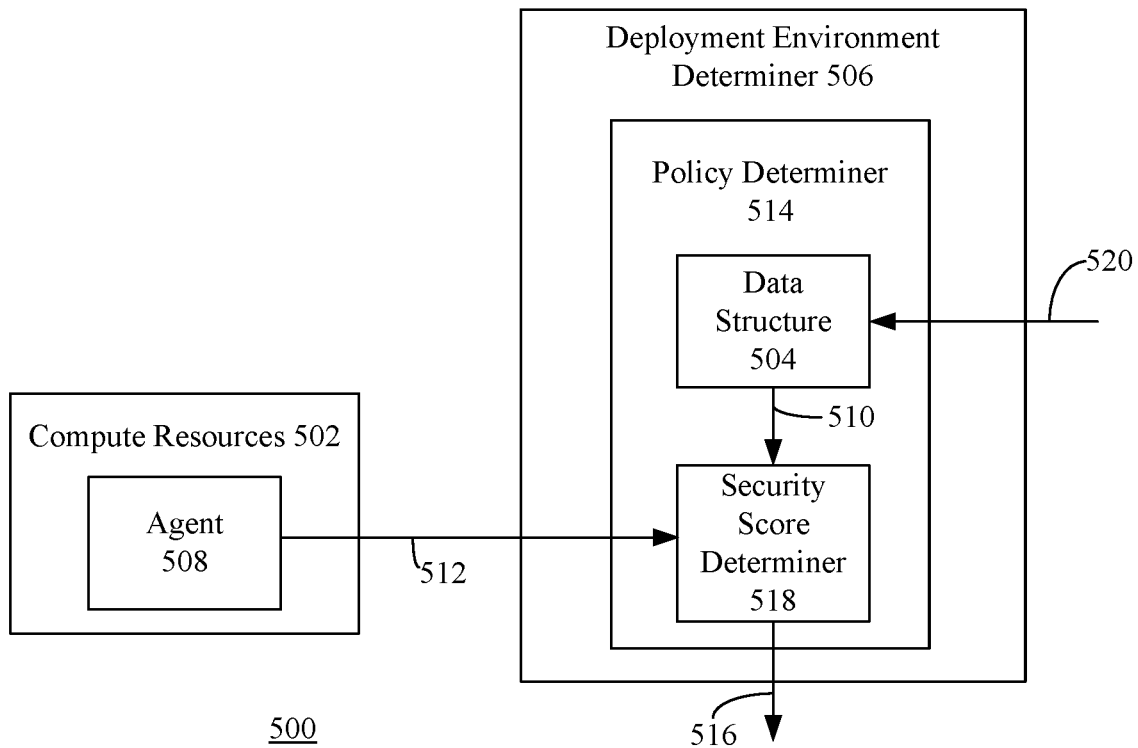
FIG. 5 shows a block diagram of a system for determining a security score for a deployment environment in accordance with an example embodiment.

FIG. 4 shows a flowchart 400 of a method for determining a security score for a deployment environment in accordance with example embodiment. In an embodiment, flowchart 400 may be implemented by a development environment determiner 506, as described below in FIG. 5. Accordingly, flowchart 400 will be described with reference to FIG. 5. Development environment determiner 506 is an example of development environment determiner 206, as described above with reference to FIG. 2. As shown in FIG. 5, deployment environment determiner 506 is communicatively coupled to compute resources 502, which are examples of compute resources 102. Deployment environment determiner 506 comprises a policy determiner 514, which is an example of policy determiner 214, as described above with reference to FIG. 2. Policy determiner 514 comprises a data structure 504 and a security score determiner 518. Each of compute resources 502 comprises an agent 508. Other structural and operational embodiments will be apparent to persons skilled in the relevant art(s) based on the following discussion regarding flowchart 400 and deployment environment determiner 506.

As shown in FIG. 4, the method of flowchart 400 begins at step 402. At step 402, for each of the recommended security settings, an indication as to whether the plurality of computing resources is in compliance with the recommended security settings is received. For example, with reference to FIG. 4, policy determiner 514 may receive classification(s) 520 determined by classification model 212. Classification(s) 520 are examples of classification(s) 220, as described above with reference to FIG. 2. Classification 520 is provided to data structure 504. Data structure 504 maps different security policies to different deployment environments. Policy determiner 514 may analyze the scores of classification(s) 520 to determine the highest score. The classification of classification(s) 520 having the highest score is determined to be the classification of compute resources 502. Alternatively, classification model 212 may provide the classification having the highest score to policy determiner 214. After determining the deployment classification, policy determiner 214 may provide, as an input, the classification to data structure 504. Data structure 504 outputs the security policy corresponding to the inputted deployment classification. In an example, data structure 504 may store and/or output each of the recommended settings (shown as recommended settings 510) for the determined security policy. Recommended settings 510 are provided to security score determiner 518. Security score determiner 518 may be configured to determine whether any of the recommended settings 510 have already been implemented for compute resources 502. For example, each of compute resources 502 may include agent 508 executing thereon. Agent 508 is configured to obtain security-related settings of its corresponding compute resource and provides the settings (shown as settings 512). Security score determiner 518 compares settings 512 to recommended settings 510 and determine which of recommended settings 510 have already been implemented for the environment in which compute resources 502 is included.

At step 404, a security score is determined for the determined deployment environment based on the received indication received for each of the recommended security settings. The security score is indicative of a level of compliance of the determined deployment environment with respect to the determined security policy. For example, with reference to FIG. 5, security score determiner 518 may output a security score 516 based on the comparison between settings 512 to recommended settings 510. Security score 516 may be provided to and displayed via a user interface (e.g., user interface 230, as described above with reference to FIG. 2).

In accordance with one or more embodiments, security score determiner 518 performs at least one of providing a first notification that indicates which of the recommend security settings have been implemented for the determined deployment environment, providing a second notification that indicates which of the recommend security settings have not been implemented for the determined deployment environment, or automatically activating at least one of the recommended security settings. For example, with reference to FIG. 5, based on the comparison between settings 512 and recommended settings 510, security score determiner may provide a first notification that indicates which of the recommend security settings have been implemented for the determined deployment environment and/or may provide a second notification that indicates which of the recommend security settings have not been implemented for the determined deployment environment. The first and second notifications may be provided to and displayed via a user interface (e.g., user interface 230, as described above with reference to FIG. 2). Policy determiner 506 may also automatically perform an action (e.g., sending a command to the corresponding compute resource) that automatically activates the security settings that have not yet been implemented and/or present a notification (e.g., via user interface 230) that indicates which security controls were automatically activated based on the determined deployment environment.

In accordance with an embodiment, recommended settings 510 are organized into different categories (or controls). Examples of such controls include, but are not limited to, system updates, encryption, authentication, port management, network access, DDoS protection, auditing and logging, etc. Within each control are a plurality of security settings associated with that control. Each control may be associated with a maximum possible score, which reflects the importance of that control. For instance, a control associated with DDoS protection may have a higher maximum possible score than a control associated with auditing and logging. Each resource (e.g., compute resources 502) affected by a recommended setting within a control contributes towards that control's current score. The current score for each control is a measure of the status of the resources within the control In accordance with such an embodiment, the score for a particular control is determined in accordance with Equation 1, which is provided below:

$$\text{Current score} = \frac{\text{Max score}}{\text{Healthy} + \text{Unhealthy}} \times \text{Healthy} \quad \text{(Equation 1)}$$

As shown in Equation 1, to calculate the score of a particular control, the maximum possible score (max score) is divided by the total amount of resources (both the resources for which recommended settings 510 have been implemented (i.e. healthy resources) and the resources for which recommended settings 510 have not been implemented (i.e., unhealthy resources)). The resulting value is then multiplied by the number of healthy resources.

After calculating the current score for each control, the results are summarized and normalized by the maximum score in accordance with Equation 2, which is shown below:

$$\text{Secure score} = \frac{\Sigma \text{Security Controls' current scores}}{\Sigma \text{Security Controls' maximum scores}} \times 100 \quad \text{(Equation 2)}$$

As shown in Equation 2, the result of the summarization and normalization is multiplied by 100 to transform the result to a percentage.

In accordance with an embodiment, compute resources of one environment may be given a higher weight than compute resources of another environment to reflect the importance thereof. For instance, compute resources in a production environment may be given a higher weight than compute resources in a test environment. The current score for a control may be based on such weights. For instance, the current score of a control may be determined in accordance with Equation 3, which is shown below:

$$\text{Current score} = \frac{\text{Max score}}{\Sigma \text{Healthy resources weights} + \Sigma \text{Unhealthy resources weights}} \times \Sigma \text{Healthy resources weights} \quad \text{(Equation 3)}$$

Accordingly, security score 516 may be relatively higher when a number of healthy resources in a production environment is greater than a number of healthy resources in a test environment.

Figure 6:
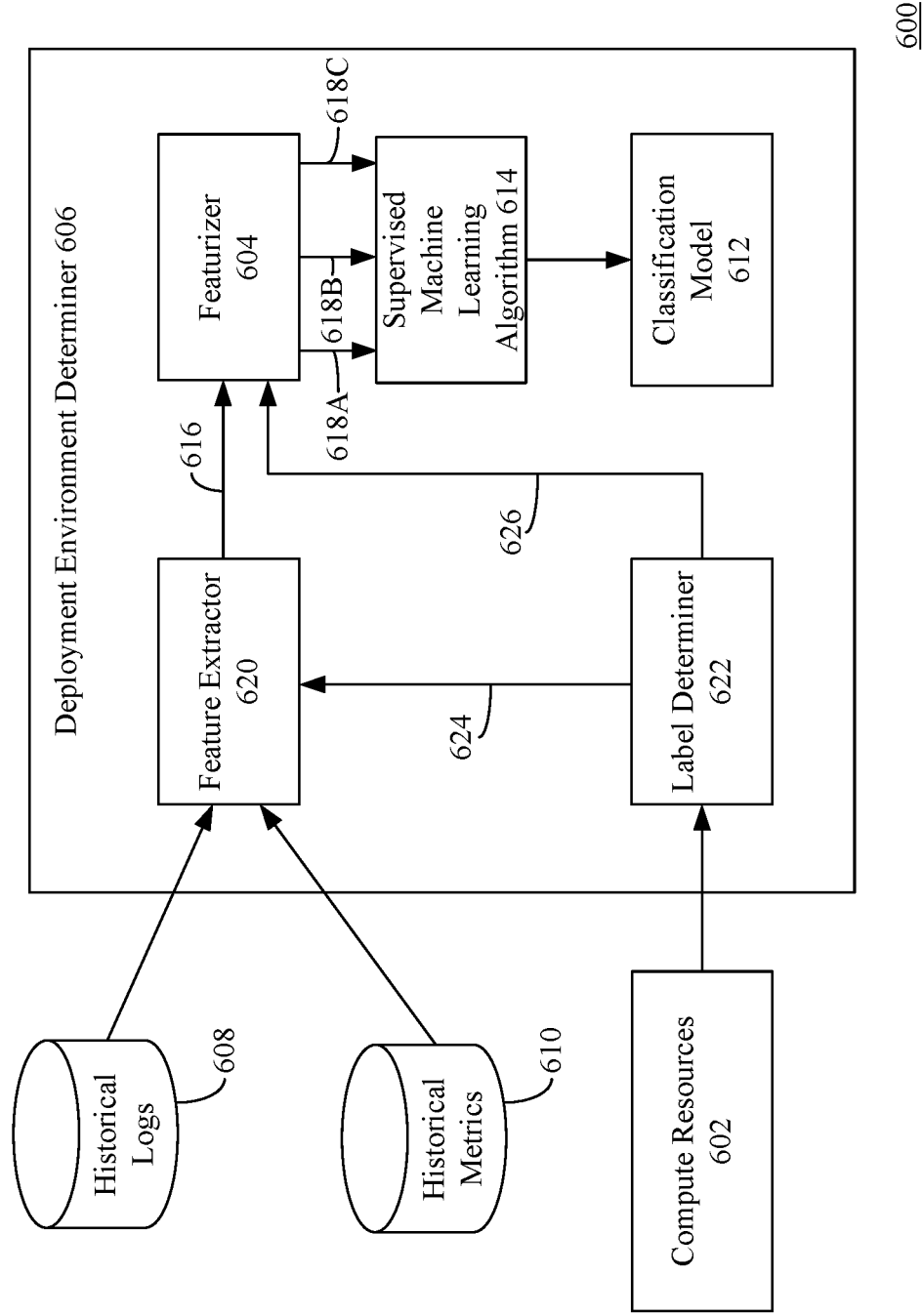
FIG. 6 shows a block diagram of a system for generating a machine learning model for identifying deployment environments for compute resources in accordance with an example embodiment.

B. Techniques for Generating a Machine Learning Model for Identifying Deployment Environments FIG. 6 depicts a block diagram of a system 600 for generating a machine learning model for identifying deployment environments for compute resources in accordance with an example embodiment. As shown in FIG. 6, system 600 comprises a compute resources 602, deployment environment determiner 606, a first data store 608, and a second data store 610. Compute resources 602, deployment environment determiner 606, first data store 608, and second data store 610 are examples of compute resources 102, deployment environment determiner 206, first data store 208, and second data store 210, as respectively described above with reference to FIGS. 1 and 2. Deployment environment determiner 606 comprises a feature extractor 620, a featurizer 604, a supervised machine learning algorithm 614, a classification model 612, and a label determiner 622. Feature extractor 620, featurizer 604, classification model 612 are examples of feature extractor 202, featurizer 204, and classification model 212, as respectively described above with reference to FIG. 2. While FIG. 6 depicts supervised machine learning algorithm 614 as being incorporated within deployment environment determiner 606, it is noted that the embodiments described herein.

First data store 608 and/or second data store 610 may store past (or historical) logs and metrics, respectively (i.e., logs and/or data that were generated over the course of several days, weeks, months or years) indicative of usage data of compute resources 602. The usage data may be collected by a monitor, such as monitor 104, as described above with reference to FIG. 1.

One or more of compute resources 602 may be explicitly identified or labeled as being as part of a particular deployment environment. Examples of such labels include, but are not limited to, "prod-server" or "test machine". The labels may not be uniform and may vary, as they are generally user-defined labels. Label determiner 622 is configured to determine the deployment environment label associated with such compute resources 602. Label determiner 622 may utilize rule-based or natural language processing (NLP)-based techniques to determine the deployment environment labels for such compute resources 602. After determining the deployment environment labels, label determiner 602 provides an identification 624 of each of compute resources 602 for which a label was determined to feature extractor 620. Label determiner 602 also provides the determined labels (shown as labels 624) to featurizer 604.

Feature extractor 620 is configured to query first data store 608 and/or second data store 610 for past usage data (e.g., logs and/or metrics) based on identification 624. That is, feature extractor 620 queries first data store 608 and/or second data store 610 for logs and/or metrics associated with compute resources 602 for which a deployment environment label has been determined. Feature extractor 620 is configured to extract features from the received historical logs and/or metrics in a similar manner as described above with reference to FIG. 2. The extracted features (shown as features 616) are provided to featurizer 604. Features 616 are examples of features 216, as described above with reference to FIG. 2.

Featurizer 604 is configured to generate feature vectors based on features 616 for the compute resources (e.g., compute resources 602) that were identified as having a deployment environment label. Each feature vector is associated with a respective deployment environment label (e.g., deployment environment label 626) corresponding to the compute resource(s) for which features 616 were extracted. For instance, as shown in FIG. 6, a featurizer 604 may generate a first set of feature vectors 618A that is associated with a first deployment environment label (e.g., "test environment"), may generate a second set of feature vectors 618B that is associated with a second deployment environment label (e.g., "staging environment"), and may generate a third set of feature vectors 618C that is associated with a third deployment environment label ("production environment"). Feature vectors 618A-618C generated by featurizer 618 may take any form, such as a numerical, visual and/or textual representation, or may comprise any other suitable form. In an embodiment, feature vectors 618A-618C may include features such as keywords, a total number of words, and/or any other distinguishing aspects relating to the logs and/or metrics that may be extracted therefrom. Featurizer 604 may operate in a number of ways to featurize, or generate feature vectors 618A-618C for, the logs and/or metrics. For example and without limitation, featurizer 604 may featurize logs and/or metrics through time series analysis, keyword featurization, semantic-based featurization, digit count featurization, and/or n-gram-TFIDF featurization.

Feature vectors 618A-618C are provided to supervised machine learning algorithm 614 as inputs. Each of feature vectors 618A-618C are provided to supervised machine learning algorithm 614 as training data, each of which being labeled with its corresponding deployment environment label.

Using these inputs, supervised machine learning algorithm 614 learns which features are characteristic of a particular deployment environment and generates classification model 612. As described above, classification model 612 is utilized to generate a classification (or score) that is indicative of the likelihood that any given compute resource is included in a particular deployment environment. In accordance with an embodiment, classification model 612 is a logistic regression-based or random forest-based classification model.

Figure 7:
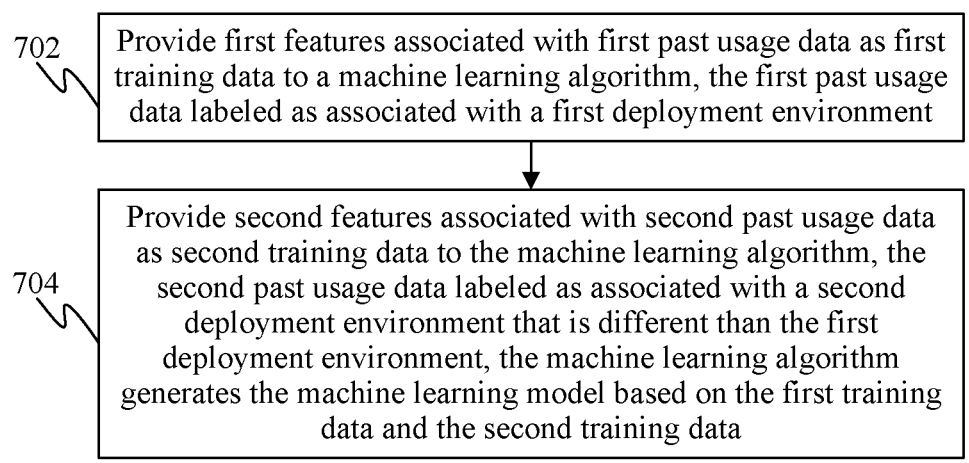
FIG. 7 shows a flowchart of a method for generating a machine learning model for identifying deployment environments for compute resources in accordance with example embodiment.

Accordingly, a machine learning model for identifying deployment environments for compute resources may be generated in many ways. For example, FIG. 7 shows a flowchart 700 of a method for generating a machine learning model for identifying deployment environments for compute resources in accordance with example embodiment. In an embodiment, flowchart 700 may be implemented by system 600, as described in FIG. 6. Accordingly, flowchart 700 will be described with continued reference to FIG. 6. Other structural and operational embodiments will be apparent to persons skilled in the relevant art(s) based on the following discussion regarding flowchart 700 and system 600.

As shown in FIG. 7, the method of flowchart 700 begins at step 702. At step 702, first features associated with first past usage data is provided as first training data to a machine learning algorithm. The first past usage data is labeled as being associated with a first deployment environment. For example, with reference to FIG. 6, featurizer 604 provides feature vector 618A as first training data to supervised machine learning algorithm 614. Feature vector 618A is associated with a first deployment environment label (e.g., "test environment").

At step 704, second features associated with second past usage data is provided as second training data to the machine learning algorithm. The second past usage data is labeled as being associated with a second deployment environment that is different than the first deployment environment. The machine learning algorithm generates the machine learning model based on the first training data and the second training data. For example, with reference to FIG. 6, featurizer 604 provides feature vector 618B as second training data to supervised machine learning algorithm 614. Feature vector 618B is associated with a second deployment environment label (e.g., "staging environment"). Supervised machine learning algorithm 614 generates classification model 612 based on the feature vectors (e.g., feature vectors 618A-618C) provided as training data to supervised machine learning algorithm 614.

III. Example Mobile and Stationary Device Embodiments

The systems and methods described above, including for identifying a deployment environment for compute resources and enhancing security for the identified deployment environment in reference to FIGS. 1-7, security management system 100, compute resources 102, monitor 104, first data store 108, second data store 110, deployment environment determiner 106, first data store 208, second data store 210, computing device 224, display screen 226, user interface 230, browser, deployment environment determiner 206, feature extractor 202, featurizer 204, classification model 212, policy determiner 214, compute resources 502, agent 508, deployment environment determiner 506, policy determiner 514, data structure 504, security score determiner 518, first data store 608, second data store 610, compute resources 602, deployment environment determiner 606, feature extractor 620, featurizer 604, supervised machine learning algorithm 614, classification model 612, and label determiner 622, and/or each of the components described therein, and/or flowcharts 300, 400, and/or 700 may be implemented in hardware, or hardware combined with one or both of software and/or firmware. For example, security management system 100, compute resources 102, monitor 104, first data store 108, second data store 110, deployment environment determiner 106, first data store 208, second data store 210, computing device 224, display screen 226, user interface 230, browser, deployment environment determiner 206, feature extractor 202, featurizer 204, classification model 212, policy determiner 214, compute resources 502, agent 508, deployment environment determiner 506, policy determiner 514, data structure 504, security score determiner 518, first data store 608, second data store 610, compute resources 602, deployment environment determiner 606, feature extractor 620, featurizer 604, supervised machine learning algorithm 614, classification model 612, and label determiner 622, and/or each of the components described therein, and/or flowcharts 300, 400, and/or 700 may be each implemented as computer program code/instructions configured to be executed in one or more processors and stored in a computer readable storage medium. Alternatively, security management system 100, compute resources 102, monitor 104, first data store 108, second data store 110, deployment environment determiner 106, first data store 208, second data store 210, computing device 224, display screen 226, user interface 230, browser, deployment environment determiner 206, feature extractor 202, featurizer 204, classification model 212, policy determiner 214, compute resources 502, agent 508, deployment environment determiner 506, policy determiner 514, data structure 504, security score determiner 518, first data store 608, second data store 610, compute resources 602, deployment environment determiner 606, feature extractor 620, featurizer 604, supervised machine learning algorithm 614, classification model 612, and label determiner 622, and/or each of the components described therein, and/or flowcharts 300, 400, and/or 700 may be implemented in one or more SoCs (system on chip). An SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 8:
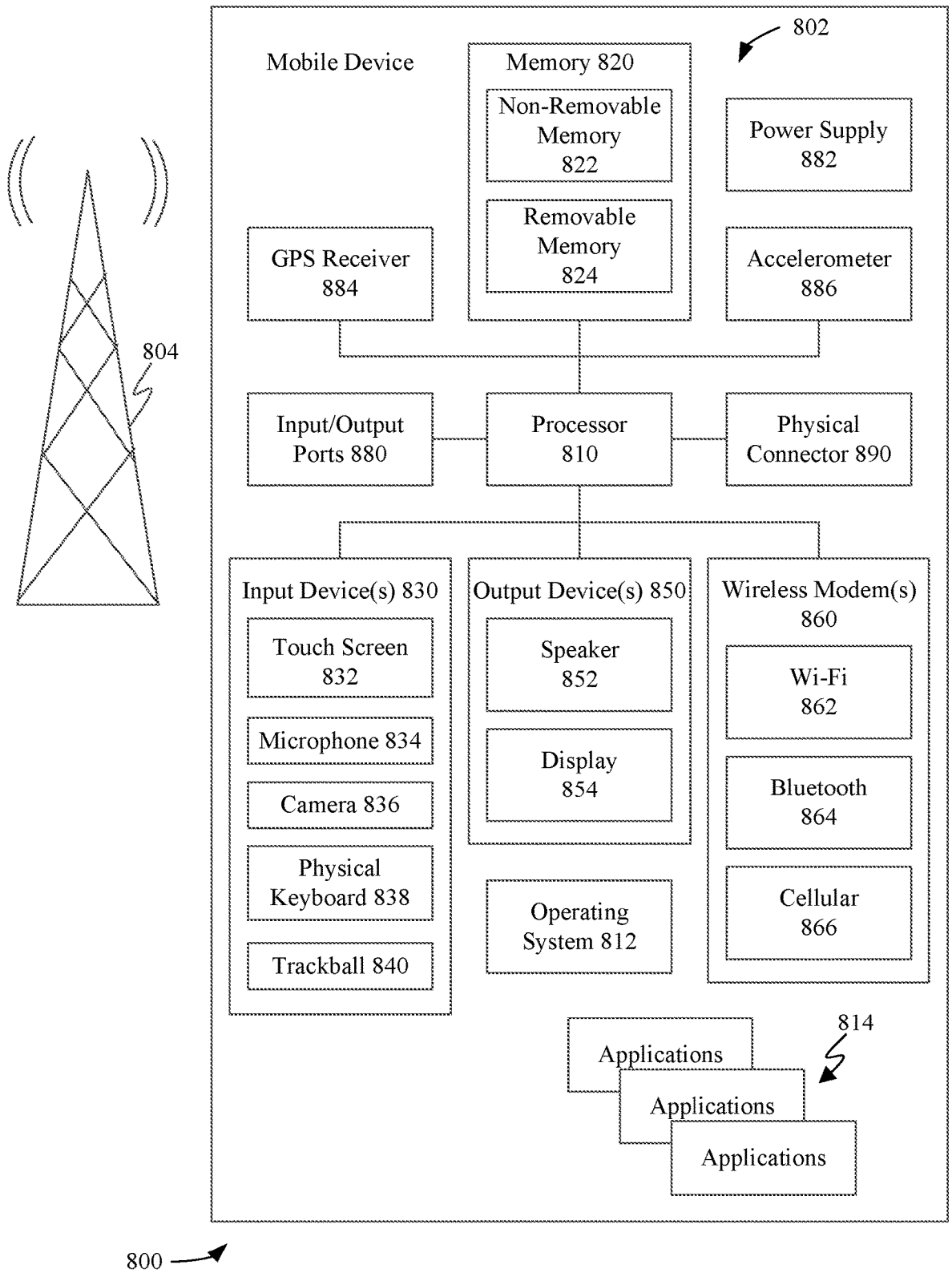
FIG. 8 is a block diagram of an exemplary user device in which embodiments may be implemented.

FIG. 8 shows a block diagram of an exemplary mobile device 800 including a variety of optional hardware and software components, shown generally as components 802. Any number and combination of the features/elements of the systems and methods described above may be implemented as components 802 included in a mobile device embodiment, as well as additional and/or alternative features/elements, as would be known to persons skilled in the relevant art(s). It is noted that any of components 802 can communicate with any other of components 802, although not all connections are shown, for ease of illustration. Mobile device 800 can be any of a variety of mobile devices described or mentioned elsewhere herein or otherwise known (e.g., cell phone, smartphone, handheld computer, Personal Digital Assistant (PDA), etc.) and can allow wireless two-way communications with one or more mobile devices over one or more communications networks 804, such as a cellular or satellite network, or with a local area or wide area network.

The illustrated mobile device 800 can include a controller or processor referred to as processor circuit 810 for performing such tasks as signal coding, image processing, data processing, input/output processing, power control, and/or other functions. Processor circuit 810 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 810 may execute program code stored in a computer readable medium, such as program code of one or more applications 814, operating system 812, any program code stored in memory 820, etc. Operating system 812 can control the allocation and usage of the components 802 and support for one or more application programs 814 (a.k.a. applications, "apps", etc.). Application programs 814 can include common mobile computing applications (e.g., email applications, calendars, contact managers, web browsers, messaging applications) and any other computing applications (e.g., word processing applications, mapping applications, media player applications).

As illustrated, mobile device 800 can include memory 820. Memory 820 can include non-removable memory 822 and/or removable memory 824. The non-removable memory 822 can include RAM (Random Access Memory), ROM (Read Only Memory), flash memory, a hard disk, or other well-known memory storage technologies. The removable memory 824 can include flash memory or a Subscriber Identity Module (SIM) card, which is well known in GSM (Global System for Mobile Communications) communication systems, or other well-known memory storage technologies, such as "smart cards." The memory 820 can be used for storing data and/or code for running operating system 812 and applications 814. Example data can include web pages, text, images, sound files, video data, or other data sets to be sent to and/or received from one or more network servers or other devices via one or more wired or wireless networks. Memory 820 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

A number of programs may be stored in memory 820. These programs include operating system 812, one or more application programs 814, and other program modules and program data. Examples of such application programs or program modules may include, for example, computer program logic (e.g., computer program code or instructions) for implementing the systems and methods described above, including the embodiments described in reference to FIGS. 1-7, security management system 100, compute resources 102, monitor 104, first data store 108, second data store 110, deployment environment determiner 106, first data store 208, second data store 210, computing device 224, display screen 226, user interface 230, browser, deployment environment determiner 206, feature extractor 202, featurizer 204, classification model 212, policy determiner 214, compute resources 502, agent 508, deployment environment determiner 506, policy determiner 514, data structure 504, security score determiner 518, first data store 608, second data store 610, compute resources 602, deployment environment determiner 606, feature extractor 620, featurizer 604, supervised machine learning algorithm 614, classification model 612, and label determiner 622, and/or each of the components described therein, and/or flowcharts 300, 400, and/or 700.

Mobile device 800 can support one or more input devices 830, such as a touch screen 832, microphone 834, camera 836, physical keyboard 838 and/or trackball 840 and one or more output devices 850, such as a speaker 852 and a display 854.

Other possible output devices (not shown) can include piezoelectric or other haptic output devices. Some devices can serve more than one input/output function. For example, touch screen 832 and display 854 can be combined in a single input/output device. The input devices 830 can include a Natural User Interface (NUI).

Wireless modem(s) 860 can be coupled to antenna(s) (not shown) and can support two-way communications between processor circuit 810 and external devices, as is well understood in the art. The modem(s) 860 are shown generically and can include a cellular modem 866 for communicating with the mobile communication network 804 and/or other radio-based modems (e.g., Bluetooth 864 and/or Wi-Fi 862). Cellular modem 866 may be configured to enable phone calls (and optionally transmit data) according to any suitable communication standard or technology, such as GSM, 3G (Third Generation), 4G (Fourth Generation), 5G (Fifth Generation), etc. At least one of the wireless modem(s) 860 is typically configured for communication with one or more cellular networks, such as a GSM network for data and voice communications within a single cellular network, between cellular networks, or between the mobile device and a public switched telephone network (PSTN).

Mobile device 800 can further include at least one input/output port 880, a power supply 882, a satellite navigation system receiver 884, such as a Global Positioning System (GPS) receiver, an accelerometer 886, and/or a physical connector 890, which can be a USB (Universal Serial Bus) port, IEEE (Institute of Electrical and Electronics Engineers) 1394 (FireWire) port, and/or RS-232 (Recommended Standard 232) port. The illustrated components 802 are not required or all-inclusive, as any components can be not present and other components can be additionally present as would be recognized by one skilled in the art.

Figure 9:
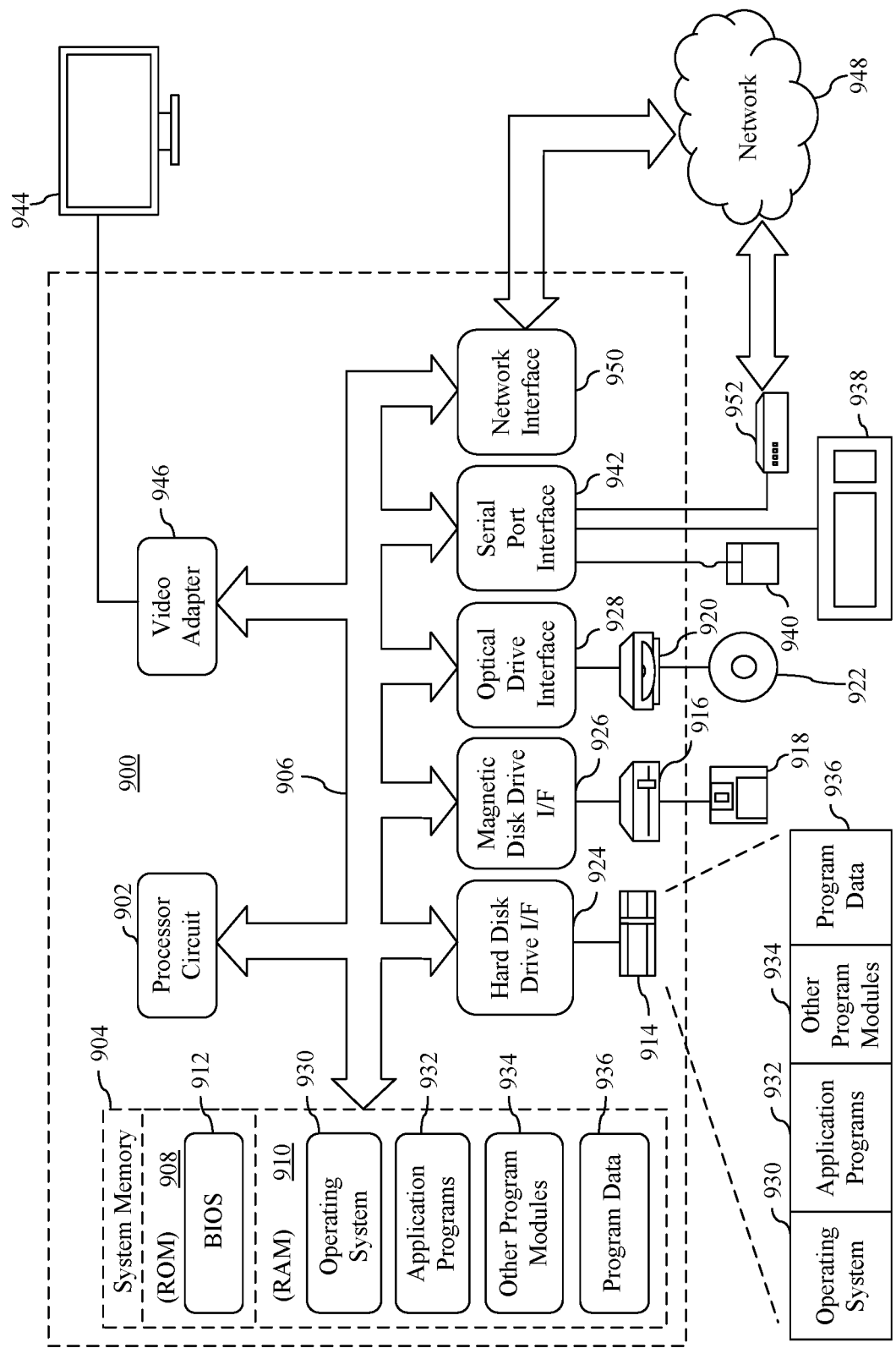
FIG. 9 is a block diagram of an example processor-based computer system that may be used to implement various embodiments.

Furthermore, FIG. 9 depicts an exemplary implementation of a computing device 900 in which embodiments may be implemented, including security management system 100, compute resources 102, monitor 104, first data store 108, second data store 110, deployment environment determiner 106, first data store 208, second data store 210, computing device 224, display screen 226, user interface 230, browser, deployment environment determiner 206, feature extractor 202, featurizer 204, classification model 212, policy determiner 214, compute resources 502, agent 508, deployment environment determiner 506, policy determiner 514, data structure 504, security score determiner 518, first data store 608, second data store 610, compute resources 602, deployment environment determiner 606, feature extractor 620, featurizer 604, supervised machine learning algorithm 614, classification model 612, and label determiner 622, and/or each of the components described therein, and/or flowcharts 300, 400, and/or 700 may be implemented in hardware, or hardware combined with one or both of software and/or firmware. For example, security management system 100, compute resources 102, monitor 104, first data store 108, second data store 110, deployment environment determiner 106, first data store 208, second data store 210, computing device 224, display screen 226, user interface 230, browser, deployment environment determiner 206, feature extractor 202, featurizer 204, classification model 212, policy determiner 214, compute resources 502, agent 508, deployment environment determiner 506, policy determiner 514, data structure 504, security score determiner 518, first data store 608, second data store 610, compute resources 602, deployment environment determiner 606, feature extractor 620, featurizer 604, supervised machine learning algorithm 614, classification model 612, and label determiner 622, and/or each of the components described therein, and/or flowcharts 300, 400, and/or 700. The description of computing device 900 provided herein is provided for purposes of illustration, and is not intended to be limiting. Embodiments may be implemented in further types of computer systems, as would be known to persons skilled in the relevant art(s).

As shown in FIG. 9, computing device 900 includes one or more processors, referred to as processor circuit 902, a system memory 904, and a bus 906 that couples various system components including system memory 904 to processor circuit 902. Processor circuit 902 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 902 may execute program code stored in a computer readable medium, such as program code of operating system 930, application programs 932, other programs 934, etc. Bus 906 represents one or more of any of several types of bus structures, including a memory bus or memory controller, a peripheral bus, an accelerated graphics port, and a processor or local bus using any of a variety of bus architectures. System memory 904 includes read only memory (ROM) 908 and random access memory (RAM) 910. A basic input/output system 912 (BIOS) is stored in ROM 908.

Computing device 900 also has one or more of the following drives: a hard disk drive 914 for reading from and writing to a hard disk, a magnetic disk drive 916 for reading from or writing to a removable magnetic disk 918, and an optical disk drive 920 for reading from or writing to a removable optical disk 922 such as a CD (Compact Disc) ROM, DVD (Digital Video Disc or Digital Versatile Disc) ROM, or other optical media. Hard disk drive 914, magnetic disk drive 916, and optical disk drive 920 are connected to bus 906 by a hard disk drive interface 924, a magnetic disk drive interface 926, and an optical drive interface 928, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 930, one or more application programs 932, other programs 934, and program data 936. Application programs 932 or other programs 934 may include, for example, computer program logic (e.g., computer program code or instructions) for implementing the systems and methods described above, including the embodiments described above with reference to FIGS. 1-7.

A user may enter commands and information into the computing device 900 through input devices such as keyboard 938 and pointing device 940. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 902 through a serial port interface 942 that is coupled to bus 906, but may be connected by other interfaces, such as a parallel port, game port, or a universal serial bus (USB).

A display screen 944 is also connected to bus 906 via an interface, such as a video adapter 946. Display screen 944 may be external to, or incorporated in computing device 900. Display screen 944 may display information, as well as being a user interface for receiving user commands and/or other information (e.g., by touch, finger gestures, virtual keyboard, etc.). In addition to display screen 944, computing device 900 may include other peripheral output devices (not shown) such as speakers and printers.

Computing device 900 is connected to a network 948 (e.g., the Internet) through an adaptor or network interface 950, a modem 952, or other means for establishing communications over the network. Modem 952, which may be internal or external, may be connected to bus 906 via serial port interface 942, as shown in FIG. 9, or may be connected to bus 906 using another interface type, including a parallel interface.

As used herein, the terms "computer program medium," "computer-readable medium," and "computer-readable storage medium" are used to generally refer to physical hardware media such as the hard disk associated with hard disk drive 914, removable magnetic disk 918, removable optical disk 922, other physical hardware media such as RAMs, ROMs, flash memory cards, digital video disks, zip disks, MEMS (Micro-electromechanical Systems), nanotechnology-based storage devices, and further types of physical/tangible hardware storage media (including system memory 904 of FIG. 9). Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF (Radio Frequency), infrared and other wireless media, as well as wired media. Embodiments are also directed to such communication media.

As noted above, computer programs and modules (including application programs 932 and other programs 934) may be stored on the hard disk, magnetic disk, optical disk, ROM, RAM, or other hardware storage medium. Such computer programs may also be received via network interface 950, serial port interface 952, or any other interface type. Such computer programs, when executed or loaded by an application, enable computing device 900 to implement features of embodiments discussed herein. Accordingly, such computer programs represent controllers of the computing device 900.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Further Example Embodiments

A computer-implemented method for enhancing security for a deployment environment comprising a plurality of computing resources is described herein. The method comprises: receiving usage data associated with the plurality of computing resources; generating a feature vector based on the usage data; providing the feature vector as input to a machine learning model that determines the deployment environment of the plurality of computing resources based on the feature vector; and determining a security policy from a plurality of security policies that is applicable for the determined deployment environment.

In an embodiment of the foregoing method, the machine learning model is generated by: providing first features associated with first past usage data as first training data to a machine learning algorithm, the first past usage data labeled as associated with a first deployment environment; and providing second features associated with second past usage data as second training data to the machine learning algorithm, the second past usage data labeled as associated with a second deployment environment that is different than the first deployment environment, wherein the machine learning algorithm generates the machine learning model based on the first training data and the second training data.

In an embodiment of the foregoing method, the determined security policy comprises a plurality of recommended security settings to be implemented for the plurality of computing resources of the determined deployment environment.

In an embodiment of the foregoing method, the method further comprises: for each of the recommended security settings, receiving an indication as to whether the plurality of computing resources is in compliance with the recommend security setting; and determining a security score for the determined deployment environment based on the indication received for each of the recommended security settings, the security score being indicative of a level of compliance of the determined deployment environment with respect to the determined security policy.

In an embodiment of the foregoing method, the method further comprises: performing at least one of: providing a first notification that indicates which of the recommend security settings have been implemented for the determined deployment environment; providing a second notification that indicates which of the recommend security settings have not been implemented for the determined deployment environment; or automatically activating at least one of the recommended security settings.

In an embodiment of the foregoing method, the determined deployment environment comprises one of: a test environment; a production environment; or a staging environment.

In an embodiment of the foregoing method, the usage data comprises at least one of: one or more network ports utilized by each of the plurality of computing resources; at least one of a type or number of network packets transmitted by each of the plurality of computing resources; at least one of a type or number of network packets received by each of the plurality of computing resources; an amount of memory utilized by each of the plurality of computing resources; a measure of processing usage for each of the plurality of computing resources; or a pattern of account logins with respect to the plurality of computing resources.

A system for enhancing security for a deployment environment comprising a plurality of computing resources is also described herein. The system comprises: at least one processor circuit; and at least one memory that stores program code configured to be executed by the at least one processor circuit. The program code comprises: a deployment environment determiner configured to: receive usage data associated with the plurality of computing resources; generate a feature vector based on the usage data; provide the feature vector as input to a machine learning model that determines the deployment environment of the plurality of computing resources based on the feature vector; and determine a security policy from a plurality of security policies that is applicable for the determined deployment environment.

In an embodiment of the foregoing system, the machine learning model is generated by: providing first features associated with first past usage data as first training data to a machine learning algorithm, the first past usage data labeled as associated with a first deployment environment; and providing second features associated with second past usage data as second training data to the machine learning algorithm, the second past usage data labeled as associated with a second deployment environment that is different than the first deployment environment, wherein the machine learning algorithm generates the machine learning model based on the first training data and the second training data.

In an embodiment of the foregoing system, the determined security policy comprises a plurality of recommended security settings to be implemented for the plurality of computing resources of the determined deployment environment.

In an embodiment of the foregoing system, the deployment environment determiner is further configured to: for each of the recommended security settings, receive an indication as to whether the plurality of computing resources is in compliance with the recommend security setting; and determine a security score for the determined deployment environment based on the indication received for each of the recommended security settings, the security score being indicative of a level of compliance of the determined deployment environment with respect to the determined security policy.

In an embodiment of the foregoing system, the deployment environment determiner is further configured to perform one of: provide a first notification that indicates which of the recommend security settings have been implemented for the determined deployment environment; provide a second notification that indicates which of the recommend security settings have not been implemented for the determined deployment environment; or automatically activate at least one of the recommended security settings.

In an embodiment of the foregoing system, the determined deployment environment comprises one of: a test environment; a production environment; or a staging environment.

In an embodiment of the foregoing system, the usage data comprises at least one of: one or more network ports utilized by each of the plurality of computing resources; at least one of a type or number of network packets transmitted by each of the plurality of computing resources; at least one of a type or number of network packets received by each of the plurality of computing resources; an amount of memory utilized by each of the plurality of computing resources; a measure of processing usage for each of the plurality of computing resources; or a pattern of account logins with respect to the plurality of computing resources.

A computer-readable storage medium having program instructions recorded thereon that, when executed by at least one processor of a computing device perform a method for enhancing security for a deployment environment comprising a plurality of computing resources is further described herein. The method comprises: The method comprises: receiving usage data associated with the plurality of computing resources; generating a feature vector based on the usage data; providing the feature vector as input to a machine learning model that determines the deployment environment of the plurality of computing resources based on the feature vector; and determining a security policy from a plurality of security policies that is applicable for the determined deployment environment.

In an embodiment of the computer-readable storage medium, the machine learning model is generated by: providing first features associated with first past usage data as first training data to a machine learning algorithm, the first past usage data labeled as associated with a first deployment environment; and providing second features associated with second past usage data as second training data to the machine learning algorithm, the second past usage data labeled as associated with a second deployment environment that is different than the first deployment environment, wherein the machine learning algorithm generates the machine learning model based on the first training data and the second training data.

In an embodiment of the computer-readable storage medium, the determined security policy comprises a plurality of recommended security settings to be implemented for the plurality of computing resources of the determined deployment environment.

In an embodiment of the computer-readable storage medium, the method further comprising: for each of the recommended security settings, receiving an indication as to whether the plurality of computing resources is in compliance with the recommend security setting; and determining a security score for the determined deployment environment based on the indication received for each of the recommended security settings, the security score being indicative of a level of compliance of the determined deployment environment with respect to the determined security policy.

In an embodiment of the computer-readable storage medium, the method further comprising: performing at least one of: providing a first notification that indicates which of the recommend security settings have been implemented for the determined deployment environment; providing a second notification that indicates which of the recommend security settings have not been implemented for the determined deployment environment; or automatically activating at least one of the recommended security settings.

In an embodiment of the computer-readable storage medium, plurality of computing resources; at least one of a type or number of network packets transmitted by each of the plurality of computing resources; at least one of a type or number of network packets received by each of the plurality of computing resources; an amount of memory utilized by each of the plurality of computing resources; a measure of processing usage for each of the plurality of computing resources; or a pattern of account logins with respect to the plurality of computing resources.

V. Conclusion

While various embodiments have been described above, it should be understood that they have been presented by way of example only, and not limitation. It will be understood by those skilled in the relevant art(s) that various changes in form and details may be made therein without departing from the spirit and scope of the described embodiments as defined in the appended claims. Accordingly, the breadth and scope of the present embodiments should not be limited by any of the above-described exemplary embodiments, but should be defined only in accordance with the following claims and their equivalents.

What is claimed is:

1. A computer-implemented method for enhancing security for a deployment environment comprising a plurality of computing resources, the method comprising:
  receiving data indicative of a usage of the plurality of computing resources in a particular deployment environment of a plurality of deployment environments, the plurality of deployment environments including a first deployment environment comprising a first stage of development and a second deployment environment comprising a second stage of development the plurality of deployment environments associated with respective stages of development;
  generating a feature vector based on the data;
  providing the feature vector as input to a machine learning-based classification model that identifies the particular deployment environment as comprising the first stage of development based on the feature vector, the machine learning-based classification model trained based on first past usage data comprising a first deployment environment label corresponding to the first stage of development and second past usage data comprising a second deployment environment label corresponding to the second stage of development; and
  determining a security policy from a plurality of security policies that is applicable for the identified deployment environment.

2. The computer-implemented method of claim 1, wherein the machine learning-based classification model is generated by:
  providing first features associated with the first past usage data as first training data to a machine learning algorithm, the first past usage data labeled as associated with the first deployment environment; and
  providing second features associated with the second past usage data as second training data to the machine learning algorithm, the second past usage data labeled as associated with the second deployment environment that is different than the first deployment environment, wherein the machine learning algorithm generates the machine learning-based classification model based on the first training data and the second training data.

3. The computer-implemented method of claim 1, wherein the determined security policy comprises a plurality of recommended security settings to be implemented for the plurality of computing resources of the identified deployment environment.

4. The computer-implemented method of claim 3, further comprising:
  for each of the recommended security settings, receiving an indication as to whether the plurality of computing resources is in compliance with the recommend security setting; and
  determining a security score for the identified deployment environment based on the indication received for each of the recommended security settings, the security score being indicative of a level of compliance of the identified deployment environment with respect to the determined security policy.

5. The computer-implemented method of claim 3, further comprising:
  performing at least one of:
    providing a first notification that indicates which of the recommend security settings have been implemented for the identified deployment environment;
    providing a second notification that indicates which of the recommend security settings have not been implemented for the identified deployment environment; or
    automatically activating at least one of the recommended security settings.

6. The computer-implemented method of claim 1, wherein the identified deployment environment comprises one of:
  a test environment;
  a production environment; or
  a staging environment.

7. The computer-implemented method of claim 1, wherein the usage data comprises at least one of:
  one or more network ports utilized by each of the plurality of computing resources;
  at least one of a type or number of network packets transmitted by each of the plurality of computing resources;
  at least one of a type or number of network packets received by each of the plurality of computing resources;
  an amount of memory utilized by each of the plurality of computing resources;
  a measure of processing usage for each of the plurality of computing resources; or
  a pattern of account logins with respect to the plurality of computing resources.

8. A system for enhancing security for a deployment environment comprising a plurality of computing resources, comprising:
  at least one processor circuit; and
  at least one memory that stores program code configured to be executed by the at least one processor circuit, the program code comprising:
    a deployment environment determiner configured to:
      receive data indicative of a usage of the plurality of computing resources in a particular deployment environment of a plurality of deployment environments, the plurality of deployment environments including a first deployment environment comprising a first stage of development and a second deployment environment comprising a second stage of development;

generate a feature vector based on the data;
provide the feature vector as input to a machine learning-based classification model that identifies the particular deployment environment as comprising the first stage of development based on the feature vector, the machine learning-based classification model trained based on first past usage data comprising a first deployment environment label corresponding to the first stage of development and second past usage data comprising a second deployment environment label corresponding to the second stage of development; and
determine a security policy from a plurality of security policies that is applicable for the identified deployment environment.

9. The system of claim 8, wherein the machine learning-based classification model is generated by:
providing first features associated with the first past usage data as first training data to a machine learning algorithm, the first past usage data labeled as associated with the first deployment environment; and
providing second features associated with the second past usage data as second training data to the machine learning algorithm, the second past usage data labeled as associated with the second deployment environment that is different than the first deployment environment,
wherein the machine learning algorithm generates the machine learning-based classification model based on the first training data and the second training data.

10. The system of claim 8, wherein the determined security policy comprises a plurality of recommended security settings to be implemented for the plurality of computing resources of the identified deployment environment.

11. The system of claim 10, wherein the deployment environment determiner is further configured to:
for each of the recommended security settings, receive an indication as to whether the plurality of computing resources is in compliance with the recommend security setting; and
determine a security score for the identified deployment environment based on the indication received for each of the recommended security settings, the security score being indicative of a level of compliance of the identified deployment environment with respect to the determined security policy.

12. The system of claim 10, wherein the deployment environment determiner is further configured to perform one of:
provide a first notification that indicates which of the recommend security settings have been implemented for the identified deployment environment;
provide a second notification that indicates which of the recommend security settings have not been implemented for the identified deployment environment; or
automatically activate at least one of the recommended security settings.

13. The system of claim 8, wherein the identified deployment environment comprises one of:
a test environment;
a production environment; or
a staging environment.

14. The system of claim 8, wherein the data comprises at least one of:
one or more network ports utilized by each of the plurality of computing resources;
at least one of a type or number of network packets transmitted by each of the plurality of computing resources;
at least one of a type or number of network packets received by each of the plurality of computing resources;
an amount of memory utilized by each of the plurality of computing resources;
a measure of processing usage for each of the plurality of computing resources; or
a pattern of account logins with respect to the plurality of computing resources.

15. A computer-readable storage medium having program instructions recorded thereon that, when executed by at least one processor, perform a method for enhancing security for a deployment environment comprising a plurality of computing resources, the method comprising:
receiving data indicative of a usage of the plurality of computing resources in a particular deployment environment of a plurality of deployment environments, the plurality of deployment environments including a first deployment environment comprising a first stage of development and a second deployment environment comprising a second stage of development;
generating a feature vector based on the data;
providing the feature vector as input to a machine learning-based classification model that identifies the particular deployment environment as comprising the first stage of development based on the feature vector, the machine learning-based classification model trained based on first past usage data comprising a first deployment environment label corresponding to the first stage of development and second past usage data comprising a second deployment environment label corresponding to the second stage of development; and
determining a security policy from a plurality of security policies that is applicable for the identified deployment environment.

16. The computer-readable storage medium of claim 15, wherein the machine learning model is generated by:
providing first features associated with the first past usage data as first training data to a machine learning algorithm, the first past usage data labeled as associated with the first deployment environment; and
providing second features associated with the second past usage data as second training data to the machine learning algorithm, the second past usage data labeled as associated with the second deployment environment that is different than the first deployment environment,
wherein the machine learning algorithm generates the machine learning-based classification model based on the first training data and the second training data.

17. The computer-readable storage medium of claim 15, wherein the determined security policy comprises a plurality of recommended security settings to be implemented for the plurality of computing resources of the identified deployment environment.

18. The computer-readable storage medium of claim 17, the method further comprising:
for each of the recommended security settings, receiving an indication as to whether the plurality of computing resources is in compliance with the recommend security setting; and
determining a security score for the identified deployment environment based on the indication received for each of the recommended security settings, the security score being indicative of a level of compliance of the identified deployment environment with respect to the determined security policy.

19. The computer-readable storage medium of claim 17, the method further comprising:
 performing at least one of:
  providing a first notification that indicates which of the recommend security settings have been implemented for the identified deployment environment;
  providing a second notification that indicates which of the recommend security settings have not been implemented for the identified deployment environment; or
  automatically activating at least one of the recommended security settings.

20. The computer-readable storage medium of claim 15, wherein the identified deployment environment comprises one of:
 a test environment;
 a production environment; or
 a staging environment.

* * * * *